United States Patent [19]

Ludwig et al.

[11] Patent Number: 5,669,199
[45] Date of Patent: Sep. 23, 1997

[54] MEMBER FOR INSERTION INTO A BOREHOLE IN A RECEIVING MATERIAL

[75] Inventors: Wolfgang Ludwig, Schwabmünchen; Erich Leibhard, Munich, both of Germany

[73] Assignee: Hilti Aktiengesellschaft, Schaan, Liechtenstein

[21] Appl. No.: 656,566

[22] Filed: May 31, 1996

[30] Foreign Application Priority Data

Jun. 1, 1995 [DE] Germany .................. 195 19 514.0

[51] Int. Cl.⁶ ........................................... E04B 1/41
[52] U.S. Cl. ................. 52/704; 52/707; 405/259.1; 405/259.5; 405/262; 411/82; 411/258; 411/411
[58] Field of Search ............... 52/698, 704, 707; 405/259.1, 259.5, 262; 411/82, 258, 411

[56] References Cited

U.S. PATENT DOCUMENTS

| | | |
|---|---|---|
| 2,761,348 | 9/1956 | Williams et al. .................. 411/441 |
| 4,094,222 | 6/1978 | Lang et al. . |
| 4,263,832 | 4/1981 | Lang et al. . |
| 4,620,406 | 11/1986 | Hugel et al. ........................ 52/704 |
| 4,968,185 | 11/1990 | Leibhard et al. . |
| 5,104,266 | 4/1992 | Daryoush et al. . |

FOREIGN PATENT DOCUMENTS 2525579  12/1976  Germany .

*Primary Examiner*—Christopher T. Kent
*Attorney, Agent, or Firm*—Anderson Kill & Olick P.C.

[57] ABSTRACT

A member (1) for insertion into a borehole (9) in a receiving material (10) has an axially extending generally cylindrical hollow body (2) closed at its leading end (4) and open at its trailing end (5) and into which a mortar mass and anchor member can be inserted. The hollow body (2) has a sieve-like mesh wall. At least one circumferentially extending strip (8) of a compressible elastic open pore material is secured on the outside surface of the hollow body (2) for cleaning the surface of the borehole while the member is inserted into the borehole.

9 Claims, 1 Drawing Sheet

MEMBER FOR INSERTION INTO A BOREHOLE IN A RECEIVING MATERIAL

BACKGROUND OF THE INVENTION

The present invention is directed to a member to be inserted into a borehole in a receiving material and, in particular, to a mesh sleeve to be inserted into the borehole with a pasty mortar mass then introduced into the sleeve. The member is an axially extending generally cylindrical body arranged to receive an anchoring member after the mortar mass has been introduced.

Frequently, composite anchors are used for attachments in an anchorage base or receiving material containing cavities, such as hollow masonry, and similar materials. Accordingly, a borehole is formed in the receiving material and is cleaned and then the member is inserted in the form of a mesh sleeve fabricated of metal or plastics. The mesh sleeve has an outside surface which can be penetrated in a sieve-like manner. After the mesh sleeve is inserted, it is filled with a specific quantity of a pasty mortar mass. A single or multi-component mass can be used as the mortar. It is a purpose of the mesh sleeve to prevent the pasty mortar mass from flowing in an uncontrolled manner out of the receiving bore and into the cavities in the receiving material in which the borehole is formed. Nevertheless, when the borehole is being filled, a portion of the mortar mass is pressed into these cavities through the sieve-like outer surface of the mesh sleeve, and the mortar passing through the mesh sleeve remains, due to its viscosity, in contact with the mortar mass remaining in the mesh sleeve and does not flow away. An anchor rod or an anchor sleeve is inserted after the injection of the mortar mass into the borehole. After the mortar mass has cured, the anchor rod or anchor sleeve forms a composite connection with the mortar mass. The composite anchor member mortar mass connection is retained in the borehole by a positive lock and composite bond formed between the mortar mass and the receiving material. The positive lock is established by the cured mortar mass previously pressed into the cavities adjoining the borehole.

To assure a reliable anchorage, drilling dust must be removed in a separate operation from the borehole prior to the insertion of the sieve-like mesh body. In the state of the art, special blowing arrangements have been known for cleaning the borehole. This cleaning step, however, is time consuming and requires, as a rule, an additional tool at the site of the borehole. A sleeve is disclosed in DE-A-2525579 on which projecting claws at its outside surface are provided which, apart from a preliminary fixing of the sleeve in the borehole, also provide a certain degree of cleaning of the borehole surface. These claws, however, also displace more pronounced contaminations from the borehole surface. An effective removal of the drilling dust is not achieved. Therefore, if a sleeve with such claws is used, as a rule, the borehole must be cleaned beforehand.

SUMMARY OF THE INVENTION

Therefore, the primary object of the present invention is to simplify the placement of composite anchors in an anchoring receiving material containing cavities and to reduce the time required for carrying out the insertion operation. This operation is intended to be carried out without any additional tools or auxiliary means for cleaning the borehole.

In accordance with the present invention, the problems previously experienced are solved by an insertion member formed of an axially elongated generally cylindrical mesh body. The insertion member of the present invention is a generally cylindrical hollow body closed at its leading end, that is the end inserted first into the borehole, and open at its opposite end into which an anchoring member can be inserted. The mesh walls of the hollow body can be penetrated in a sieve-like manner. At least one circumferentially extending strip formed of a compressible elastic open pore material is provided around the outside surface of the hollow body for cleaning the borehole as the body is pushed into the borehole. The borehole is cleaned as the insertion member is pushed into the borehole by the circumferentially extending strip located around the outside surface of the body. Due to its compressibility and elasticity, the open pore material can bear against the surface of the borehole and displace any drilling dust in the direction of the base of the borehole. A large part of the drilling dust is absorbed by the strip due to its open pore characteristic. This feature effects a reliable cleaning of the drilling dust in the borehole, and it is impossible for a separation layer to form between the surface of the borehole and the injected mortar mass. The cleaning of the borehole of the drilling dust is achieved simultaneously with the placement of the insertion member into the borehole. No additional time for a separate work step for cleaning the borehole is necessary. Furthermore, it is possible to dispense with additional tools for cleaning boreholes.

It is preferable to locate the compressible strip in the region of the hollow member adjacent to its closed leading end. As a result, the borehole is cleaned for a considerable portion of its depth and it is assured that the drilling dust, not absorbed by the pores of the strip, is pushed towards the base of the borehole.

Preferably the strip has a thickness dimension so that it can be compressed to $\frac{2}{3}$rds of its original thickness at the most while it is inserted, the thickness amounts preferably to approximately 3 to 5 millimeters. Accordingly, it is possible to push the insertion member easily into the borehole and it is compressed only to the extent that its open pores can still absorb a sufficient quantity of the drilling dust. It is advantageous for the cleaning effect of the strip secured on the outside surface of the insertion member if its minimum width, that is the dimension in the axial direction, is not less than its thickness. The maximum width of the strip is in the range of approximately $\frac{1}{10}$ to $\frac{1}{5}$th of the axial length of the hollow body forming the insertion member. It is also possible to use several circumferentially extending strips arranged consecutively instead of a single strip. The sum of the widths of the strips correspond at most to a range of approximately $\frac{1}{10}$ to $\frac{1}{5}$th of the length of the hollow body. In this way, sufficient surface of the insertion member is available for retention in the borehole.

If several circumferentially extending strips are used, all of them are located in the leading end half of the hollow body adjacent the closed end. Such an arrangement permits cleaning the borehole for a considerable portion of its depth and assures that the drilling dust, not absorbed by the pores of the strip, is pushed towards the base of the borehole. With the consecutively arranged strips, the borehole surface is cleaned repeatedly as the member is inserted affording an improved cleaning effect.

The circumferentially extending strips are preferably formed of an open pore foam material having a volumetric density in the range of approximately 20 to 40 kilograms per cubic meter. The strips are bonded to the outside surface of the hollow body or are disposed between stops provided on the outside surface. Accordingly, they are secured against axial displacement when the hollow body is inserted into the receiving bore.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
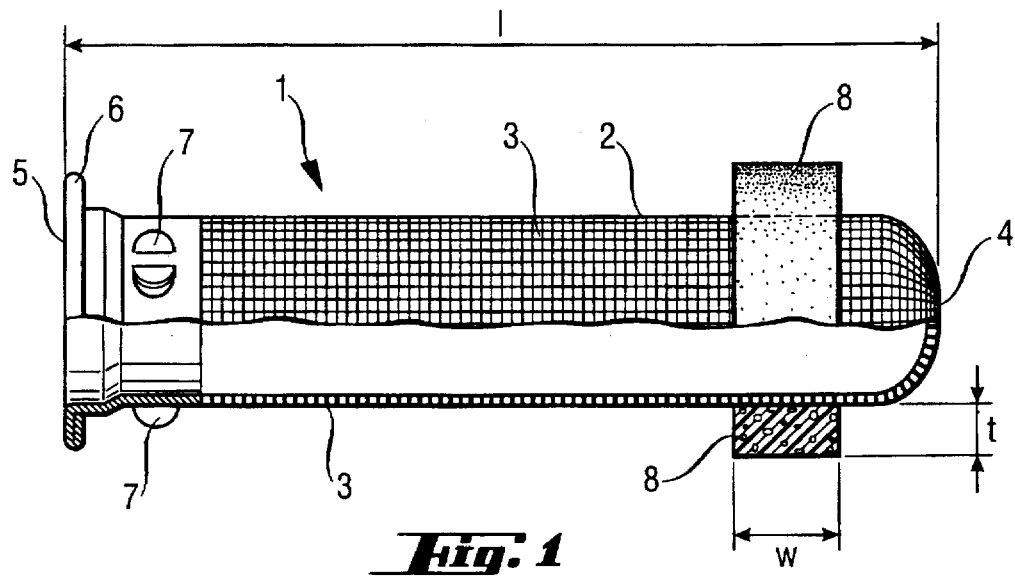
FIG. 1 is an axially extending view, partly in section, of a member embodying the present invention.
Figure 2:
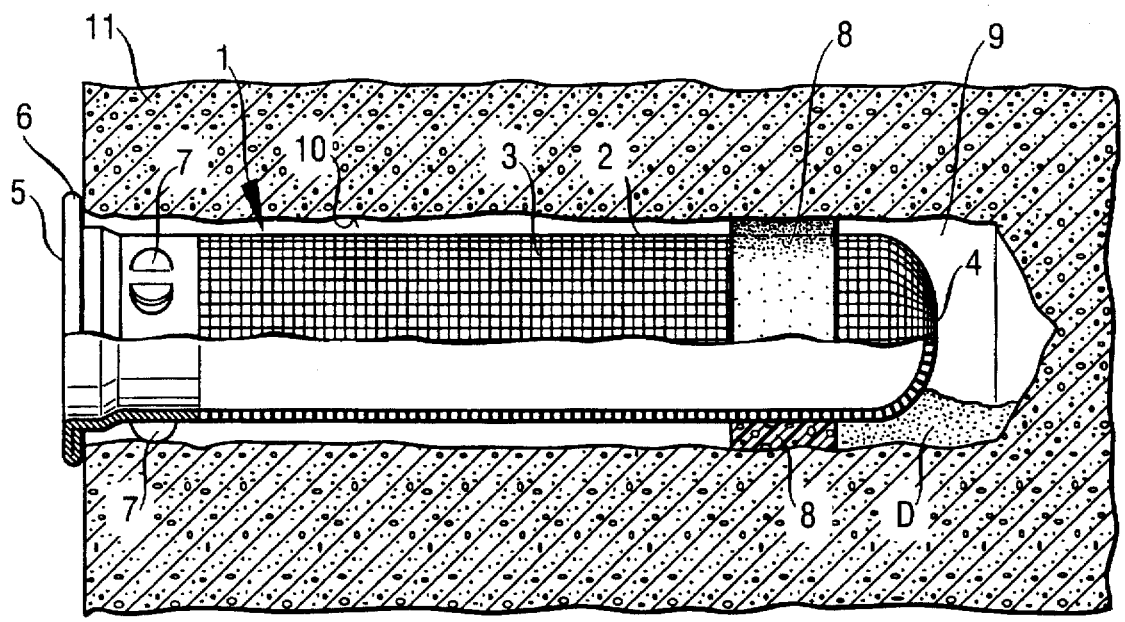
FIG. 2 is a view similar to FIG. 1 with the member inserted into a borehole in a receiving material or anchorage.

In FIG. 1 an insertion member 1 embodying the present invention is shown partly in axially extending section. In use, as shown in FIG. 2, the insertion member 1 is inserted or placed into an axially extending borehole 9 in a receiving material 11. Member 1 is formed as an axially extending mesh sleeve having a generally cylindrically shaped hollow body 2 with a mesh wall 3 having a sieve-like structure. For reasons of clarity the sieve-like arrangement of the hollow body 2 is shown in the mesh wall 3 in the upper part FIG. 1. Hollow body 2 has a closed leading end 4, that is, the end first inserted into the borehole 9, and an open trailing end 5 through which a single or multi component mortar mass can be injected followed by an anchoring member. At its trailing end, the hollow body has a circumferentially extending collar 6 extending radially outwardly from the mesh sleeve 3 and serving as a stop at the surface of the receiving material 11 in which the borehole 9 is drilled. The collar 6 prevents the member 1 from being inserted too deeply into the receiving borehole adjacent to the collar 6, on the outside surface of the wall of the hollow body, are elastic lugs 7 for retaining the member 1 in position during overhead installation and securing it against dropping out of the borehole.

A circumferential strip 8 formed of a compressible elastic, open pore material is secured on the leading end half of the hollow body 2 and is placed close to the leading end. Preferably, the material forming the strip is an elastic foam material with a volumetric density of approximately 20–40 kilograms per cubic meter. The thickness of the foam material strip, that is its dimension in the radial direction, is selected so that it can be compressed up to ⅔rds of its original thickness when the member 1 is inserted into the borehole 9. Preferably, the thickness is in the range of 3–5 millimeters. The maximum width W or axial dimension of the foam material strip 8 is in the range of approximately ⅒ to ⅕th of the axial length of the hollow body 2, preferably it amounts to approximately 10 millimeters.

While the member 1 shown in FIG. 1 has a single foam material strip 8, it can be appreciated that several circumferentially extending foam material strips could be provided at the outside surface of the mesh wall 3 of the hollow body 2. Preferably, these strips would be located in the leading end half of the hollow body. The axial dimension or width of the individual foam material strips is selected so that the sum of the width of all of the strips is in the range of approximately ⅒ to ⅕th of the axial length of the hollow body.

The minimum axial dimension or width W of each foam material strip is selected so that it is not less than the thickness dimension t.

Each of the foam material strips is secured to the outside surface of the hollow body by adhesion or bonding. The individual foam material strips 8 can, however, also be disposed between stops on the outside surface of the hollow body 2 for securement against displacement. The multiple strips are not shown. In FIG. 2 the member 1 of FIG. 1 is inserted into the borehole 9 in the receiving material or anchorage 11. The receiving material 11 can be masonry containing cavities, however, it can also be a solid base for instance lime or sandstone. As shown in FIG. 2, the foam material strip 8, when inserted, is located in the leading end region of the insertion member bearing against the surface 10 of the borehole 9 due to its elasticity and compressibility and compensates for any irregularities in the surface of the borehole. Accordingly, it is assured that the drilling dust D is wiped off the surface 10 of the borehole 9 and the portion of the drilling dust not absorbed by the open pores of the foam material strip 8 is pressed forwardly towards the base or inner end of the borehole 9. This removal of the drilling dust prevents a separation layer from forming between surface 10 of borehole 9 and the injected hardened mortar mass.

While the invention has been described with respect to the mesh sleeve having a sieve-like character, it can be appreciated that the illustrated arrangement with at least one foam material strip 8 in the leading end half of the hollow body can also be formed by insertion members manufactured, for instance, from plastics or sheet metal and having a wall equipped with holes or similar through apertures for passage of the injected mortar mass.

The surface of the borehole 9 is cleaned as the insertion member 1 is pushed into it by the circumferentially extending strip 8 formed of the compressible elastic, open pore material fastened on the outside surface of the member 1. Due to its elasticity, the open pore material can bear against the surface of the borehole 9 and push the drilling dust in the direction of the base of the borehole. A large part of the drilling dust is absorbed by the open pores of the material. Accordingly, the drilling dust is reliably removed from the surface 10 of the borehole 9, and no separation layer can form between the surface of the borehole and the mortar mass. Cleaning the drilling dust from the surface of the borehole occurs simultaneously with the insertion of the member 1 into the borehole. No time consuming, separate work step for cleaning the borehole is required. It is also possible to dispense with any additional tools for cleaning the borehole. As a result, the setting procedure for the composite type anchor is simplified and the time required is appreciably reduced.

While specific embodiments of the invention have been shown and described in detail to illustrate the inventive principles, it will be understood that the invention may be embodied otherwise without departing from such principles.

We claim:

1. A member for insertion into a borehole defining a surface in a receiving material comprising an axially extending generally cylindrical hollow body (2) having an axial direction, a closed leading end (4) for inserting into the borehole and an open trailing end (5) for receiving an anchoring member therein, said body being formed of a sieve-like mesh wall, means being secured on an outer surface of said mesh wall for cleaning the surface of the borehole as said member (1) is inserted therein, said means (8) comprising at least one circumferentially extending strip (8) of a compressible elastic open pore material secured to and extending around the outer surface of said mesh wall.

2. The member, as set forth in claim 1, wherein said strip (8) being located in a leading end half of said hollow body (2) adjacent the leading end (4).

3. The member, as set forth in claim 1 or 2, wherein said strip (8) has an original thickness (t) dimension extending radially whereby said strip is at a maximum compressible to $2/3$ of the original thickness while the member (1) is inserted into said borehole (9).

4. The member, as set forth in claim 3, wherein said thickness (t) dimension is being in the range of approximately 3 to 5 millimeters.

5. The member, as set forth in claim 3, wherein said strip (8) has a width (W) measured in the axial direction of said hollow body (2) not less than the thickness dimension (t) of said strip.

6. The member, as set forth in claim 5, wherein said strip (8) has a maximum width in the range of approximately $1/10$ to $1/5$ of a length of said hollow body (2) extending in the axial direction thereof.

7. The member, as set forth in claim 4, wherein said strip (8) being formed of an open pore foam material having a volumetric density of approximately 20 to 40 kilograms per cubic meter.

8. The member, as set forth in claim 7, wherein said strip (8) being secured against axial displacement relative to an outside surface of said hollow body (2).

9. The member, as set forth in claim 8, wherein said strip (8) being secured to the outside surface of said hollow body by one of adhesion and bonding.

* * * * *